United States Patent [19]

Napoli

[11] Patent Number: 5,279,127
[45] Date of Patent: * Jan. 18, 1994

[54] MULTI-HOLE FILM COOLED COMBUSTOR LINER WITH SLOTTED FILM STARTER

[75] Inventor: Phillip D. Napoli, West Chester, Ohio

[73] Assignee: General Electric Company, Cincinnati, Ohio

[*] Notice: The portion of the term of this patent subsequent to Aug. 10, 2010 has been disclaimed.

[21] Appl. No.: 941,770

[22] Filed: Sep. 4, 1992

Related U.S. Application Data

[63] Continuation of Ser. No. 631,855, Dec. 21, 1990, abandoned.

[51] Int. Cl.$^5$ ............................................. F23R 3/06
[52] U.S. Cl. ............................................. 60/754; 60/757
[58] Field of Search ............... 60/752, 754, 755, 756, 60/757, 261; 431/352

[56] References Cited

U.S. PATENT DOCUMENTS

| | | | |
|---|---|---|---|
| 2,576,046 | 11/1951 | Scarth | 60/752 |
| 3,420,058 | 1/1969 | Howald et al. | 60/757 |
| 3,527,543 | 9/1970 | Howald . | |
| 3,623,711 | 11/1971 | Thorstenson . | |
| 4,050,241 | 9/1977 | DuBell | 60/757 |
| 4,206,865 | 6/1980 | Miller | 60/757 |
| 4,232,527 | 11/1980 | Reider | 60/754 |
| 4,485,630 | 12/1984 | Kenworthy | 60/757 |
| 4,566,280 | 1/1986 | Burr | 60/757 |
| 4,642,993 | 2/1987 | Sweet . | |
| 4,653,983 | 3/1987 | Vehr . | |
| 4,664,597 | 5/1987 | Auxier et al. . | |
| 4,687,436 | 8/1987 | Shigetal | 431/352 |
| 4,695,247 | 9/1987 | Enzaki et al. | 431/352 |
| 4,696,431 | 9/1987 | Buxe . | |
| 4,773,593 | 9/1988 | Auxier et al. | 239/127.3 |
| 4,833,881 | 5/1989 | Vdoviak et al. | 60/261 |
| 4,878,283 | 11/1989 | McLean | 60/757 |
| 4,896,510 | 1/1990 | Foltz | 60/757 |
| 4,923,371 | 5/1990 | Ben-Amoz | 416/97 R |
| 4,949,545 | 8/1990 | Shekleton | 60/756 |

FOREIGN PATENT DOCUMENTS 2221979  2/1990  United Kingdom .................. 60/757

OTHER PUBLICATIONS

Multihole Cooling Film Effectiveness and Heat Transfer, by R. E. Mayle and F. J. Camarata—Transactions of the ASME—Nov., 1975.

Alternate Cooling Configuration for Gas Turbine Combustion Systems, by D. A. Nealy, S. B. Reider, H. C. Mongia—Allison Gas Turbine Divn., Prepared for Advisory Group for Aerospace Research & Development 65th Meeting—May 1985.

NASA-CR-159656—Advanced Low-Emissions Catalytic-Combustor Program—Phase I Final Report by G. J. Sturgess—Jun. 1981 report.

Primary Examiner—Richard A. Bertsch
Assistant Examiner—Timothy S. Thorpe
Attorney, Agent, or Firm—Jerome C. Squillaro; James P. Davidson

[57] ABSTRACT

A gas turbine engine combustor is provided with a combustor liner film cooling means having a slotted nugget or ring for starting a cooling film on and upstream of a multi-hole single wall sheet metal combustor liner which is generally annular in shape and having disposed therethrough a multi-hole film cooling means which includes at least one pattern of small closely spaced film cooling holes sharply angled in the downstream direction. In one embodiment the cooling holes are angled in a circumferential direction which generally coincides with the swirl angle of the flow along the surface of the liner. Another embodiment provides a that the annular liner is corrugated so as to form an axially extending wavy wall to help resist buckling which is particularly useful for outer liners in the combustion section of aircraft gas turbine engines and in the exhaust section of gas turbine engines and afterburners.

6 Claims, 5 Drawing Sheets

MULTI-HOLE FILM COOLED COMBUSTOR LINER WITH SLOTTED FILM STARTER

This application is a continuation of application Ser. No. 07/631,855, filed Dec. 21, 1990, now abandoned.

BACKGROUND OF THE INVENTION

Field of the Invention

This invention relates to film cooled combustor liners for use in gas turbine engines, and more particularly, to aircraft gas turbine engine combustor liners in the main combustion section and afterburner.

Description of Related Art

Combustor liners are generally used in the combustion section of a gas turbine engine which is located between the compressor and turbine sections of the engine. Combustor liners are also used in the exhaust section of aircraft engines that have afterburners. Combustors generally include an exterior casing and an interior combustor wherein fuel is burned producing a hot gas usually at an intensely high temperature such as 3,000° F. or even higher. To prevent this intense heat from damaging the combustor before it exits to a turbine, a heat shield or combustor liner is provided in the interior of the combustor. This combustor liner thus prevents the intense combustion heat from damaging the combustor or surrounding engine.

Prior methods for film cooling combustion liners provided circumferentially disposed rows of film cooling slots such as those depicted in U.S. Pat. No. 4,566,280 by Burr and U.S. Pat. No. 4,733,538 by Vdoviak et al. which are typified by complex structures that have non-uniform liner thicknesses which give rise to thermal gradients which cause low cycle fatigue in the liner and therefore shorten their potential life expectancy and reduce their durability. The complex shapes and machining required to produce these liners negatively effects their cost and weight.

A more detailed discussion of the related art may be found in related U.S. Pat. No. 5,181,379 entitled "GAS TURBINE ENGINE MULTI-HOLE FILM COOLED COMBUSTOR LINER AND METHOD OF MANUFACTURE", invented by Wakeman et al., filed Nov. 15, 1990, assigned to the same assignee and U.S. patent application Ser. No. 07/614,368, now abandoned, entitled "COMBUSTOR LINER WITH CIRCUMFERENTIALLY ANGLED FILM COOLING HOLES", invented by the present inventor, filed Nov. 15, 1990, assigned to the same assignee, and both are incorporated herein by reference.

Engine designers have long sought to incorporate low weight single wall combustor liners capable of withstanding the temperatures and pressure differentials found in combustors. To that end the invention described in the Wakeman reference provides a single wall, preferably sheet metal, annular combustor liner having multi-hole film cooling holes which are disposed through the wall of the liner at sharp downstream angles. The multi-hole film cooling holes are spaced closely together to form at least one continuous pattern designed to provide film cooling over the length of the liner. The present invention provides multi-hole film cooling holes which have a diameter of about 20 mils with a nominal tolerance of about ±2 mils, are spaced closely together about 6½ to 7½ hole diameters apart, have a downstream angle of 20 degrees with a nominal tolerance of about ±1 degree, and a circumferential angle with respect to the engine center-line of between 30 and 65 degrees. Axially adjacent holes are circumferentially offset by half the angle between circumferentially adjacent holes to further enhance the evenness of the cooling film injection points. The Wakeman invention further provides an embodiment wherein the combustor liner may be corrugated so as to form a way wall which is designed to prevent buckling and is particularly useful for outer burner liners in the combustion section of gas turbine engines and exhaust duct burner liners in aircraft gas turbine engines having afterburners.

A phenomena which occurs both in the main combustion section and in the afterburner combustion section is swirl, wherein swirled patterns of higher thermal degradation areas are formed on the liner. The patterns generally coincide with the swirl of the combustor flow induced by swirlers in the fuel nozzles to promote better combustion and in the exhaust section by turbine nozzles. To that end the circumferentially angled film cooling holes were provided such that the film cooling holes were generally angled to coincide with the swirl angle.

SUMMARY OF THE INVENTION

The present invention provides a single wall multi-hole film cooling combustor liner similar to that described in the Wakeman reference, wherein the film cooling effectiveness is improved by further including a single film starting ring or nugget located at a forward portion of a multi-hole film cooled combustor liner. Another embodiment provides for angling or clocking the multi-hole film cooling holes in the circumferential direction which is best accomplished by drilling the holes so that the axis of the cooling hole is 30 to 65 degrees to the combustor flow path. The orientation of clocking is preferrably in the direction of the combustor swirl pattern as may be generated by the dome swirlers and stage 1 high pressure turbine nozzle inlets.

In accordance with one embodiment of the present invention, the combustor liner may be corrugated so as to form a way wall which is designed to prevent buckling and is particularly useful for outer burner liners in the combustion section of gas turbine engines and exhaust duct burner liners in aircraft gas turbine engines having afterburners.

ADVANTAGES

Combustor liners made in accordance with the present invention improve the cooling film effectiveness provided by multi-hole film cooling holes which itself dramatically reduces the radial temperature gradients typically found in conventional nugget or panel film cooled combustor liners. The film cooling effectiveness is enhanced because the film starting slot provides good film coverage around the liner. Reduction of these radial gradients result in a consequent reduction in thermal hoop stress and improved Low Cycle Fatigue life. The use of a simple wave form, as found in conventional augmenting liners, may be used in the outer liner of the combustion section of the engine, as well as the augmenting liner, to provide a low cost means of imparting buckling resistance to the combustor liner.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
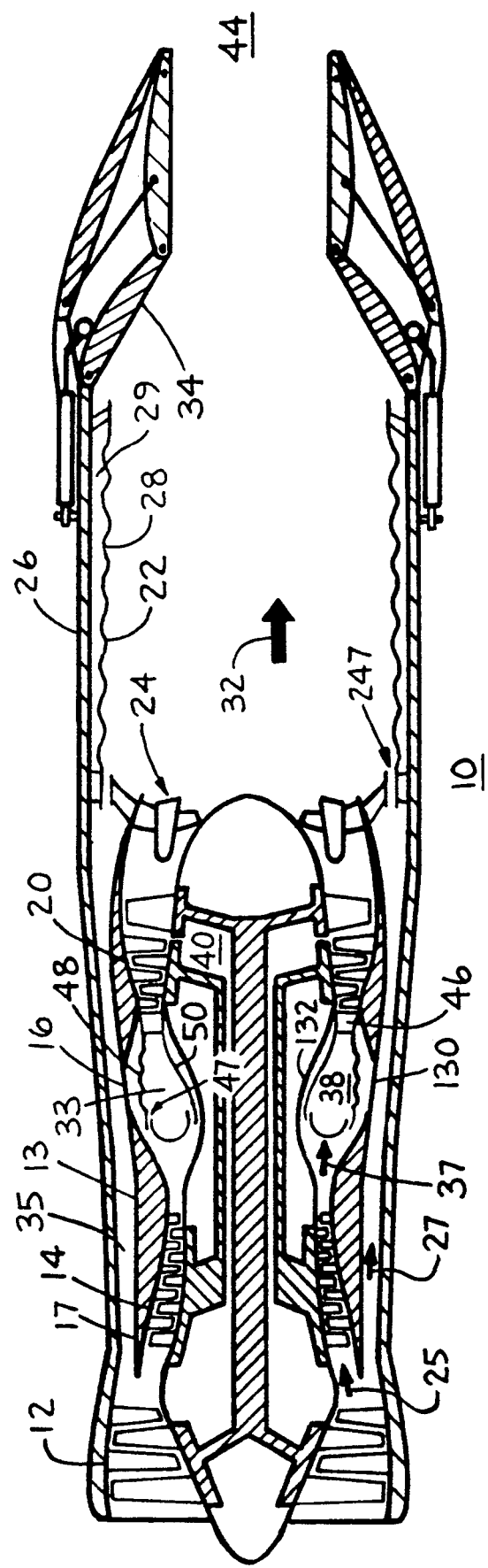
FIG. 1 is a diagrammatic view of a typical gas turbine engine including a core engine combustion section and an afterburning exhaust section having combustors in accordance with the present invention.

The gas turbine engine of FIG. 1 represents a conventional aircraft gas turbine engine having a combustion section combustor and afterburner employing combustor liners of the present invention.

Referring to FIG. 1, a typical gas turbine engine 10 is shown comprising a fan section 12 which is in serial flow relationship with an engine core 13 and with a by-pass duct 35 which is generally disposed, in concentric fashion, about the engine core. Flow from engine core 13 and by-pass duct 35 is discharged to an exhaust section 22 having a nozzle 34 used to help produce thrust. Splitter 17 by-passes a portion of the air flow 27, referred to as by-pass flow, from fan section 12 through by-pass duct 35 around engine core 13. The remaining airflow, referred to as core air flow 25, is compressed by compressor 14 and discharged to a combustion section 16 which includes axially and circumferentially extending outer and inner combustor liners 48 and 50, respectively. Outer and inner combustor liners 48 and 50 are radially spaced from each other to define a portion of annular combustion flow path or combustion zone 33 therebetween where a portion of core flow 25 is mixed with fuel and the resultant mixture is combusted. The combustion section produces hot combustion gases which are mixed with the remainder of the compressor discharge flow and the resultant heated effluent is then flowed to turbine section 20 which powers compressor section 14 and fan section 12.

An afterburner 24, as illustrated in FIG. 1, is disposed in exhaust section 22 downstream of turbine section 20 and is operable for burning additional fuel with bypass air 27 and core flow 25 in order to augment or produce additional thrust. Thrust augmentation is particularly useful in military aircraft for short periods of time such as during takeoff, climb and during combat maneuvers. Exhaust section 22 contains gas flow 32 which is circumscribed by an annular case 26 and an annular afterburner liner 28 radially inward of casing 26, and a cooling plenum 29 therebetween. The afterburner may also be referred to as an augmenter.

Outer and inner combustor liners 48 and 50 and afterburner liner 28 provide some generally similar functions. The preferred embodiment of the present invention provides multi-hole film cooled liners 48 and 50 and afterburner liner 28 including slotted film starting means 47 and 247 for the combustor liners and afterburner liner respectively. The liners contain the hot combustion gases and provide a flowpath suitable to promote efficient combustion. Pressurized air enters combustion section 16 where it is mixed with fuel and burned. The hot gases of combustion, which may in some gas turbine engines exceed 3000° F. exit combustion section 16, flow thereafter past turbine inlet 46 and through the remaining portion of turbine section 20. The hot gases are then expelled at a high velocity from the engine 10 through exhaust nozzle 34, whereby the energy remaining therein provides thrust generation by engine 10.

Figure 2:
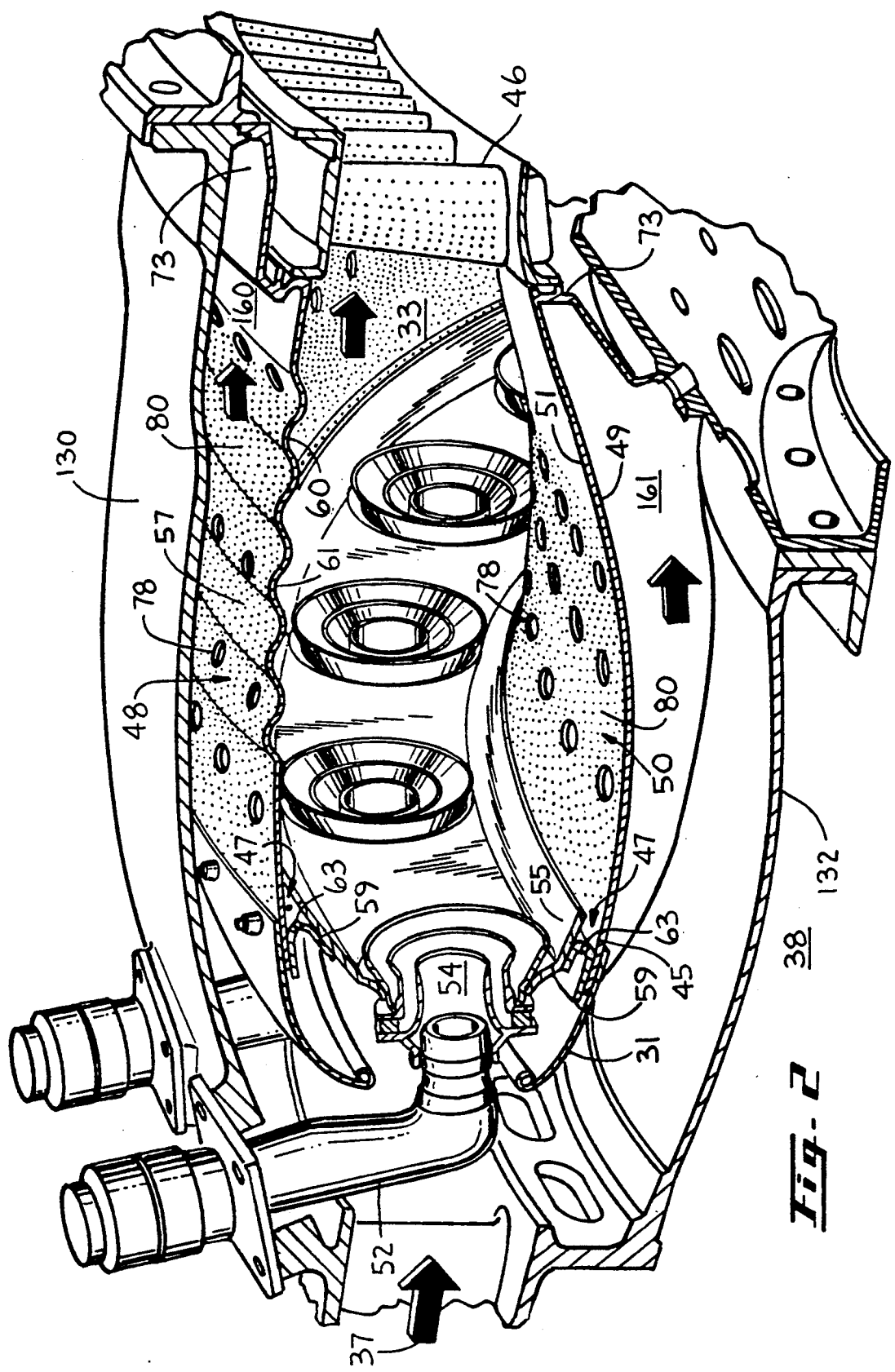
FIG. 2 is a perspective view of the core engine combustion section of the engine depicted in FIG. 1 according to the preferred embodiment of the present invention.

Referring now to FIG. 2, a perspective view of the combustion section 16 is depicted comprising a combustor assembly 38 positioned in the compressor discharge flow 37 between an outer combustor casing 130 and an inner combustor casing 132 in energized fluid supply communication with the turbine section denoted by turbine inlet 46. Combustor assembly 38 is further comprised of axially and circumferentially extending outer and inner combustor liners 48 and 50, respectively, radially spaced from each other to define a portion of annular flow path or combustion zone 33 therebetween. Outer liner 48 and outer casing 130 form an outer combustor passage 160 therebetween and inner liner 50 and inner casing 132 form an inner passage 161 wherein said passages provide for receiving cool compressor discharge air.

Disposed at the upstream end of combustor liners 48 and 50 is a plurality of fuel injectors 52 mounted within a plurality of apertures 54 in the combustor dome 31 of combustor assembly 38. Note, that combustor assembly 38 and outer and inner combustor liners 48 and 50 have a preferred annular configuration, extending circumferentially about the center-line of the engine. Accordingly, fuel injectors 52 are circumferentially spaced from each other to provide a number of injection points for admitting a fuel/air mixture to combustor assembly 38 over the circumferential extent of annular combustion flow path 33.

The upstream ends of combustor liners 48 and 50 are formed with means to be attached to and axially and radially supported by combustor dome 31. Downstream ends 73 have radial support means such as interference fits or other conventional support means which provides radial support and allows for thermal growth of liners 48 and 50.

Outer and inner liners 48 and 50 comprise a single wall annular sheet or shell having a generally axially extending configuration. Outer liner 48, in the preferred embodiment, includes generally annular corrugations 60 which provides outer liner 48 with a wavy wall cross-section. Outer liner 48 has a cold side 57 in contact with the relatively cool air outside combustion zone 33 and a hot side 61 facing the combustion zone and includes a means for providing multi-hole film cooling of liner 48. Similarly, inner liner 50 is provided with a multihole film cooling means.

A slot type cooling film starting means a generally shown as nugget or ring 45, is provided for both outer and inner liners 48 and 50. In the preferred embodiment the slot means comprises slots 47 formed between an inner dome wall 55 spaced apart from outer liner 48 and inner liner 50 by spacer walls 59 having cooling air feed holes 63 circumferentially disposed therethrough for providing cooling air to slots 47 for starting the cooling film on outer and inner 48 and 50. The annular chamber and slot may be segmented liners.

Figure 3:
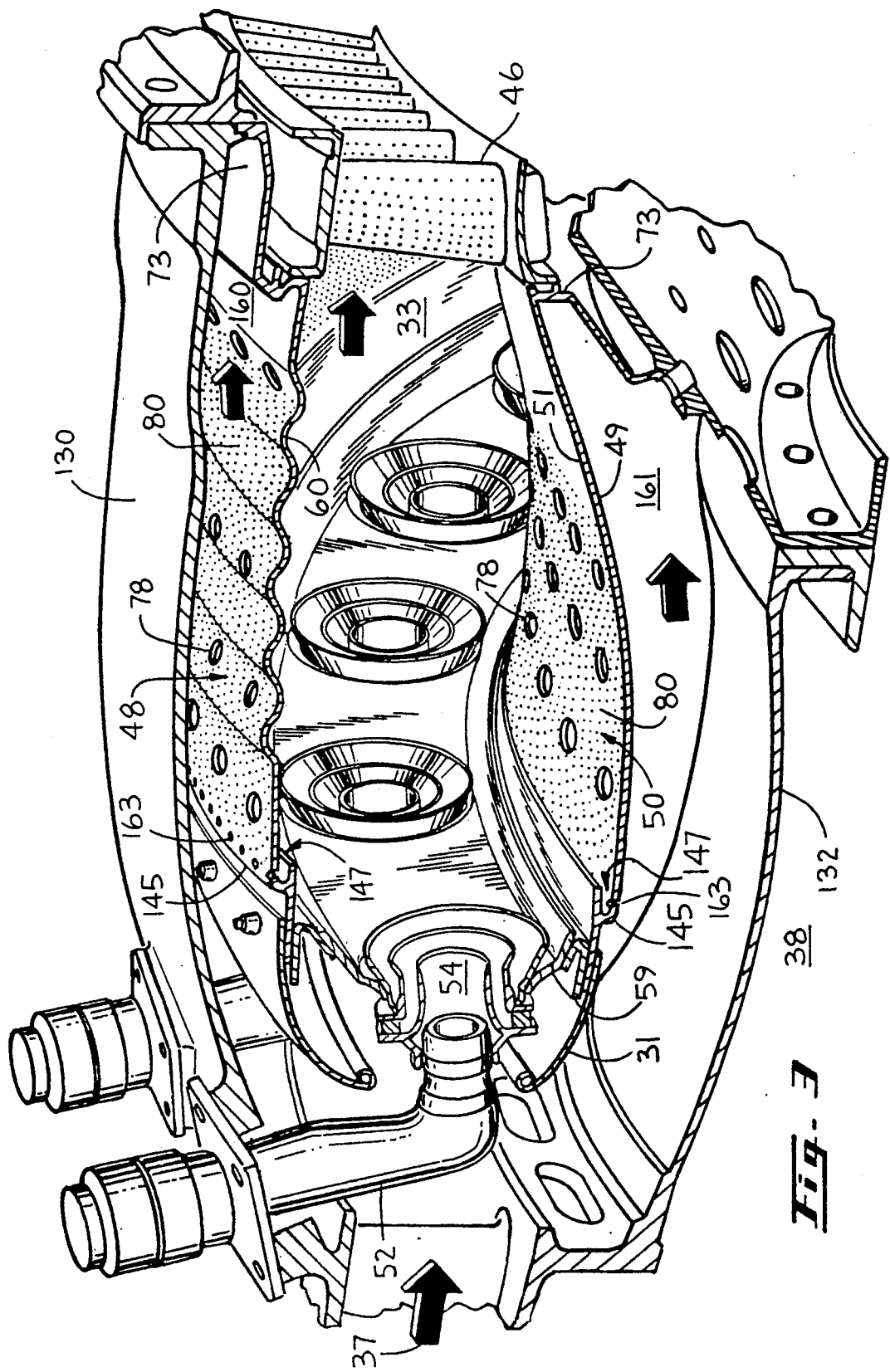
FIG. 3 is a perspective view of the core engine combustion section of the engine depicted in FIG. 1 depicting an alternative embodiment of the present invention wherein the starting ring is integral with the liner.
Figure 4A:
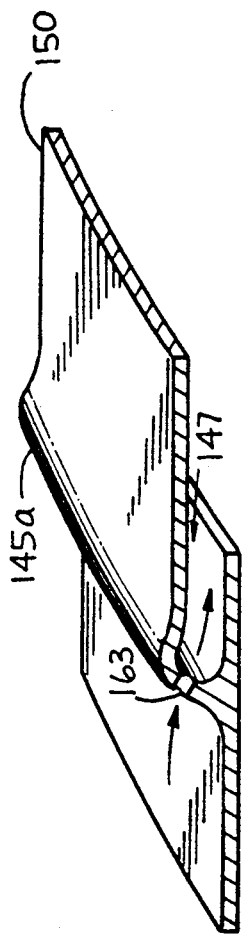
FIGS. 4a-4c are enlarged perspective views of a forward portion of the combustor liner shown in FIG. 3 depicting alternative embodiments of the cooling film starting ring of the present invention.
Figure 4B:
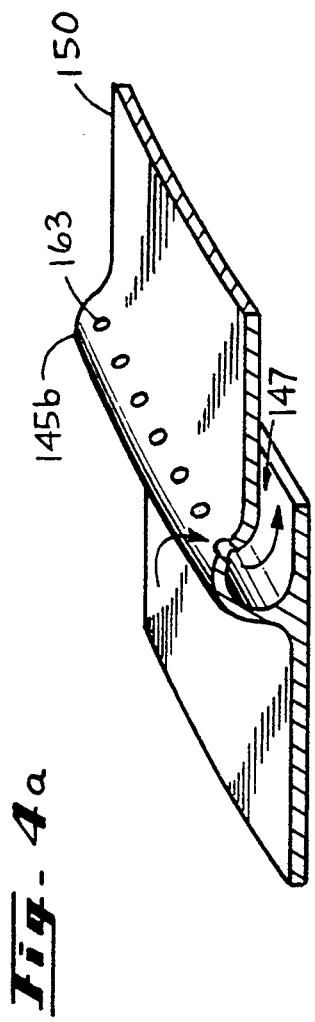
Figure 4C:
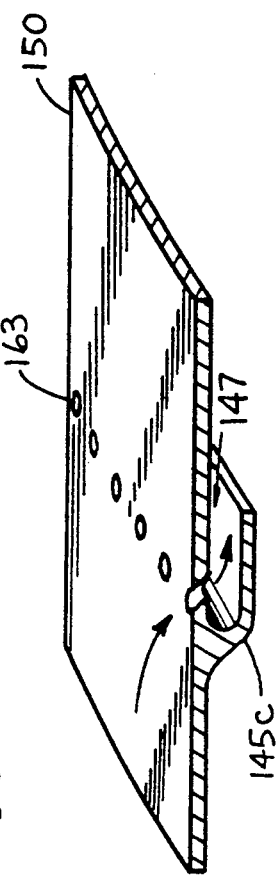

An alternative to the preferred embodiment is shown in FIG. 3 wherein a the film starting ring in the form of a nugget 145 is integral with and forms a forward portion of the multi-hole film cooled liner. Such an alternative embodiment, which may be advantageous in certain applications, provides a second slot type cooling means as part of the liner in the form of a conventional ring or nugget 145 having a nugget slot 147 formed therein and nugget feed holes 163 for providing cooling air to the nugget to be used to start the cooling film on the liner. The starting ring or nugget is preferably welded to the multi-hole film cooled liner. Alternate starting nuggets 145A, 145B, and 145C are illustrated in FIGS. 4A, 4B, and 4C respectively to illustrate different arrangements of cooling air feed holes 163 and rings 145 contemplated for use in the integral form of the present invention wherein the slot type film starting ring is integral with the multi-hole liner.

Figure 5:
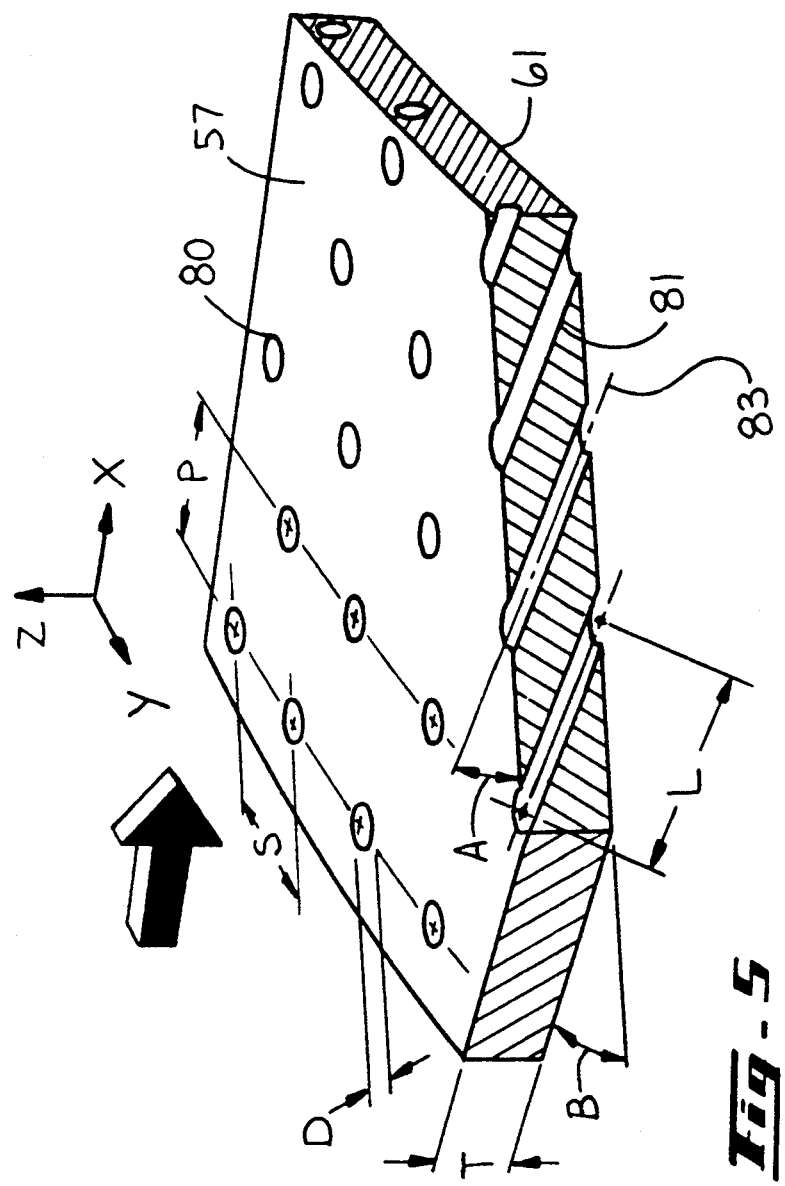
FIG. 5 is an enlarged perspective view of a portion of a combustor liner depicting circumferentially sharlpy angled multi-hole film cooling holes in a portion of a combustor liner in accordance with one embodiment of the present invention.

Referring to FIG. 5, a frame of reference is provided having axes labelled X, Y, and Z wherein X indicates the downstream direction of the flow along the surface of the liner, Y is in the circumferential direction, and Z is normal to the combustor liner surface on the surface of the liner. The means for providing multi-hole film cooling, shown in greater detail in FIG. 5, comprises a plurality of very narrow closely spaced sharply downstream (indicated by the arrow in FIG. 5) angled film cooling holes 80 which are axially rearward slanted from cold surface 57 to hot surface 61 of liner 48 at an angle in the range of about 15° to 20° and clocked or slanted in the circumferential direction, indicated by Y in the frame of reference, at a clock angle B corresponding to the swirl of the flow which is usually between 30 and 65 degrees with respect to the downstream direction of the flow indicated by the arrow. In order to provide a more even circumferential distribution of cooling air, axially adjacent rows R1 and R2 of holes 80 are circumferentially offset by half the angle or distance between circumferentially adjacent holes to further enhance the evenness of the cooling film while retaining a distance between rows P preferably equal in amount to S.

It has been found that from a manufacturing and cost standpoint a downstream slant angle A of about 20° is preferred with respect to either surface of liner 48. Smaller downstream slant angles A may be may be advantageous for improved cooling and therefore an alternative downstream slant angle A in the range of about 20° to 15° may be used if the associated costs are warranted. Downstream slant angles smaller than 15 degrees may weaken the liner structure. The holes have a preferred diameter of 20 mils (0.02 inches) and are preferably spaced about 130 mils (0.15 inches) off center from each other, as measured between their respective center-lines 83, or about six and one half (6½) hole diameters.

Similarly inner liner 50 is formed of a single wall annular sheet or shell having a plurality of very narrow closely spaced sharply slanted film cooling holes 80 which are axially rearward slanted from cold surface 49 to hot surface 51 of liner 50.

Dilution air is primarily introduced by a plurality of circumferentially extending spaced apart dilution apertures 78 disposed in each of inner and outer liners 50 and 48. Each aperture 78 has a cross-sectional area substantially greater than the cross-sectional area of one of the multi-hole cooling holes 80 and are generally far smaller in number. Dilution apertures 78 and to a smaller extent cooling holes 80 serve to admit additional air into combustor assembly 38. This additional air mixes with the air/fuel mixture from injectors 52 and, to some extent, will promote some additional combustion.

Referring to FIG. 5, liner thickness T, multi-hole film cooling hole spacing S (the distance between cooling hole center-lines 83), film cooling hole length L and diameter D, and cooling hole angle A of cooling holes 80 are a function of the cooling flow requirements to meet the durability characteristics of the particular engine in which it is used. Preferably, the combustor liners have a thermal barrier coating on their hot side 61 to further reduce the heat load into the liners. Cooling holes 80 are laser drilled holes. Typically combustor liner wall thickness T is sized to meet both mechanical loading requirements and to allow the cooling flow through cooling hole 80 to develop an adequate length to diameter ratio (L/D) of at least 1.0 and preferably longer. This minimum L/D is required to form a good film and to maximize convective cooling along an internal cooling hole surface 81 within cooling hole 80. We have also found that the cooling holes should be spaced about 7 diameters apart from each other or between center-lines 83 of adjacent cooling holes 80.

The process of laser drilling is preferably done by drilling the holes from hot side 61 to cold side 57 of the combustor liner, which for outer liner 48 and afterburner liner 28 is from the inside of the shell out, thereby producing a diffusion cooling hole having an outlet which is slightly wider than the cooling hole inlet. The diffusion of the cooling flow through cooling hole 80 provides a further advantage by enhancing the film cooling effectiveness which reduces the amount of cooling flow needed through cooling holes 80 and the pressure and engine performance losses associated with such cooling means. It may be preferable, particularly in the case of outer liners 48 and afterburner liners 28, to provide a buckling resistance means such as corrugations 60 shown in FIGS. 1 and 2. Buckling of outer 48 liner due to inward pressure load is a primary design consideration. Small and medium diameter short length combustors may only require a reasonable liner thickness combined with its formed shape and end support provided by combustor dome 31 and stator seal to provide sufficient buckling margin. This margin can be increased by using significant axial curvature in the liner to increase its section modulus. Very large combustor liners, having about a 30 inch diameter or larger, such as outer liner 48 in combustion section 16 and long combustor liners such as afterburner liner 28 may require additional features to prevent buckling. The present invention provides corrugations 60 of outer liner 48 and afterburner liner 28 to restrict the liner deflection and resist buckling.

The buckling resistance imparted by the wave design of corrugations 60 is similar to that applied in augmenter liners and must be designed to provide that the film effectiveness of the liner is not adversely affected by the wave form. We have found that a shallow sine wave form is preferred. An example of such a shallow wavy wall or corrugated liner is illustrated in the preferred embodiment which provides, for a combustor section outer liner 48 having a 30 inch diameter, a trough to crest depth along hot surface 51 of about 80 mils (0.08 inches) and a crest to crest length of about 900 mils (0.9 inches) We have found that such a configuration is very effective for maintaining the integrity of the cooling film and providing sufficient buckling resistance. The method of manufacturing combustor liners incorporating the features of the preferred embodiment of the present invention is best described in the above referenced patent application to Wakeman et al., as applied to an outer liner 48 for a combustion section 16 having a typical diameter of 30 inches which may typically contain over 20,000 holes.

While the preferred embodiment of our invention has been described fully in order to explain its principles, it is understood that various modifications or alterations may be made to the preferred embodiment without departing from the scope of the invention as set forth in the appended claims.

We claim:

1. An annular gas turbine combustor comprising:

a liner for containing a hot combustor flow, a combustor casing disposed apart from said liner and at least in part forming an airflow passage therebetween such that said liner and casing bound said airflow passage, said liner comprising a single wall annular shell having a hot side and a cold side and at least one continuous pattern of small closely spaced film cooling holes angled sharply in a predetermined downstream flow direction, said film cooling holes having a hole diameter, a downstream slant angle, and spaced at least sufficiently close enough together to effect a cooling film on said hot side of said shell during combustor operation, a slot type cooling film starting means including an inlet upstream of said liner, and said inlet operably positioned upstream of said film cooling holes wherein said inlet and said film cooling holes operably positioned to receive airflow directly from said airflow passage.

2. An annular gas turbine combustor comprising:

a slot type cooling film starting means upstream of a liner, for containing a hot combustor flow, a combustor casing disposed apart from said liner and at least in part forming an airflow passage therebetween such that said liner and casing bound said airflow passage, said liner comprising a single wall annular shell having a hot side and a cold side and at least one continuous pattern of small closely spaced film cooling holes angled sharply in a predetermined downstream flow direction, said film cooling holes having a hole diameter, a downstream slant angle, and spaced at least sufficiently close enough together to effect a cooling film on said hot side of said shell during combustor operation, and wherein said film cooling holes are aligned in a circumferential direction coinciding with a predetermined swirl angle of the flow.

3. An annular gas turbine combustor comprising:

a slot type cooling film starting means upstream of a liner, for containing a hot combustor flow, a combustor casing disposed apart from said liner and at least in part forming an airflow passage therebetween such that said liner and casing bound said airflow passage, said liner comprising a single wall annular shell having a hot side and a cold side and at least one continuous pattern of small closely spaced film cooling holes angled sharply in a predetermined downstream flow direction, said film cooling holes having a hole diameter, a downstream slant angle, and spaced at least sufficiently close enough together to effect a cooling film on said hot side of said shell during combustor operation, and wherein said film cooling holes are angled in a circumferential direction in a range of between 30 and 65 degrees measured generally from a downstream component of the flow's direction in the combustor.

4. An annular gas turbine combustor comprising:

a slot type cooling film starting means upstream of a liner, for containing a hot combustor flow, a combustor casing disposed apart from said liner and at least in part forming an airflow passage therebetween such that said liner and casing bound said airflow passage, said liner comprising a single wall annular shell having a hot side and a cold side and at least one continuous pattern of small closely spaced film cooling holes angled sharply in a predetermined downstream flow direction, said film cooling holes having a hole diameter, a downstream slant angle, and spaced at least sufficiently close enough together to effect a cooling film on said hot side of said shell during combustor operation, and wherein a portion of said shell is corrugated to form a shallow wavy wall cross-section.

5. A gas turbine combustor as claimed in claim 2 wherein said film cooling holes have a downstream angle slanted from said cold side of said shell to said hot side of said shell and wherein said downstream angle has a value of about twenty degrees.

6. A gas turbine combustor as claimed in claim 1 wherein said slot type cooling film starting means is a slotted ring attached to a dome of the combustor.

* * * * *